(12) United States Patent
Jiang et al.

(10) Patent No.: US 8,248,377 B2
(45) Date of Patent: *Aug. 21, 2012

(54) TOUCH PANEL

(75) Inventors: Kai-Li Jiang, Beijing (CN); Shou-Shan Fan, Beijing (CN); Ga-Lane Chen, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 389 days.

This patent is subject to a terminal disclaimer.

(21) Appl. No.: 12/286,141

(22) Filed: Sep. 29, 2008

(65) Prior Publication Data
US 2009/0102810 A1    Apr. 23, 2009

(30) Foreign Application Priority Data
Oct. 23, 2007    (CN) .......................... 2007 1 0202227

(51) Int. Cl.
*G06F 3/041*    (2006.01)
(52) U.S. Cl. ........ 345/173; 313/582; 313/336; 428/339; 257/222
(58) Field of Classification Search .......... 345/173–174; 445/24; 313/336; 257/222; 524/496
See application file for complete search history.

(56) References Cited

U.S. PATENT DOCUMENTS

| 4,659,873 A | 4/1987 | Gibson et al. |
|---|---|---|
| 4,922,061 A | 5/1990 | Meadows et al. |
| 4,933,660 A | 6/1990 | Wynne, Jr. |
| 5,181,030 A | 1/1993 | Itaya et al. |
| 5,853,877 A | 12/1998 | Shibuta |
| 5,861,583 A | 1/1999 | Schediwy et al. |
| 6,373,472 B1 | 4/2002 | Palalau et al. |
| 6,423,583 B1 | 7/2002 | Avouris et al. |
| 6,628,269 B2 | 9/2003 | Shimizu |
| 6,629,833 B1 | 10/2003 | Ohya et al. |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,084,933 B2 | 8/2006 | Oh et al. |
| 7,215,329 B2 | 5/2007 | Yoshikawa et al. |
| 7,242,136 B2 | 7/2007 | Kim et al. |

(Continued)

FOREIGN PATENT DOCUMENTS
CN    2539375    3/2003
(Continued)

OTHER PUBLICATIONS

George Gruner, "Carbon Nanonets Spark New Electronics", Scientific American, pp. 76-83, May 2007.

(Continued)

*Primary Examiner* — Peter Macchiarolo
*Assistant Examiner* — Mary Ellen Bowman
(74) *Attorney, Agent, or Firm* — Altis Law Group, Inc.

(57) ABSTRACT

A touch panel includes a first electrode plate, a second electrode plate separated from the first electrode plate. The first electrode plate includes a first substrate and a first conductive layer disposed on a lower surface of the first substrate. The second electrode plate includes a second substrate and a second conductive layer disposed on an upper surface of the second substrate. The first conductive layer and the second conductive layer include a carbon nanotube film respectively.

19 Claims, 5 Drawing Sheets

U.S. PATENT DOCUMENTS

| | | |
|---|---|---|
| 7,336,261 B2 | 2/2008 | Yu |
| 7,348,966 B2 | 3/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,645,497 B2 | 1/2010 | Spath et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kawase et al. |
| 2005/0209392 A1* | 9/2005 | Luo et al. ............ 524/496 |
| 2006/0010996 A1* | 1/2006 | Jordan et al. ............ 73/866.1 |
| 2006/0022221 A1* | 2/2006 | Furukawa et al. ............ 257/222 |
| 2006/0044284 A1 | 3/2006 | Tanabe |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1* | 12/2006 | Spath et al. ............ 345/173 |
| 2006/0274049 A1 | 12/2006 | Spath et al. |
| 2006/0275956 A1* | 12/2006 | Konesky ............ 438/128 |
| 2006/0278444 A1 | 12/2006 | Binstead |
| 2007/0065651 A1 | 3/2007 | Glatkowski et al. |
| 2007/0075619 A1* | 4/2007 | Jiang et al. ............ 313/336 |
| 2007/0081681 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0029292 A1 | 2/2008 | Takayama et al. |
| 2008/0088219 A1 | 4/2008 | Yoon et al. |
| 2008/0129666 A1 | 6/2008 | Shimotono et al. |
| 2008/0138589 A1 | 6/2008 | Wakabayashi et al. |
| 2008/0192014 A1* | 8/2008 | Kent et al. ............ 345/173 |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1* | 1/2010 | Jiang et al. ............ 345/173 |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1* | 4/2010 | Jiang et al. ............ 445/24 |
| 2010/0171099 A1 | 7/2010 | Tombler, Jr. et al. |
| 2010/0271330 A1 | 10/2010 | Philipp |
| 2011/0032196 A1* | 2/2011 | Feng et al. ............ 345/173 |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |

| | | |
|---|---|---|
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | W02006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yoshikazu Nakayama, "Technology Development of CNT Long Yarns and CNT Sheets", Nano Carbon Handbook, Japan TSN INC, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Kai-Li Jiang, Qun-Qing Li, Shou-Shan Fan, "Continuous carbon nanotube yarns and their applications" , Physics, China, pp. 506-510,Aug. 31,2003,32(8)(lines from the 4th line to 35th line in the right col. of p. 507 may be relevant).

Yu Xiang, Technique of Touch Panel & the Production of Resistance-type Touch Panel Insulation Dot, Journal of Longyan Teachers College, p. 25-26, vol. 22, No. 6, 2004.

Fan et al. "Self-Oriented Regular Arrays of Carbon Nanotubes and Their Field Emission Properties". Science, vol. 283, (1999); pp. 512-514.

Wu et al."Transparent, Conductive Carbon Nanotube Films". Science,vol. 305,(2004);pp. 1273-1276.

Susuki et al. "Investigation of physical and electric properties of silver pastes as binder for thermoelectric materials". Review of Scientific Instruments,76,(2005);pp. 023907-1 to 023907-5.

ASM Handbook."Volume Properties and Selection: Nonferrous Alloys and Special-Purpose Materials".Apr. 2007; pp. 840-853.

* cited by examiner

FIG. 5 ns entitled, "TOUCH PANEL", Ser. No. 12/286,266, filed
TOUCH PANEL

RELATED APPLICATIONS

This application is related to commonly-assigned applicaon Sep. 29, 2008; "TOUCH PANEL AND DISPLAY DEVICE USING THE SAME", Ser. No. 12/286,181, filed on Sep. 29, 2008; "TOUCH PANEL AND DISPLAY DEVICE USING THE SAME". Ser. No. 12/286,154, filed on Sep. 29, 2008; "TOUCH PANEL AND DISPLAY DEVICE USING THE SAME", Ser. No. 12/286,189, filed on Sep. 29, 2008; "TOUCH PANEL AND DISPLAY DEVICE USING THE SAME", Ser. No. 12/286,176, filed on Sep. 29, 2008; "ELECTRONIC ELEMENT HAVING CARBON NANOTUBES", Ser. No. 12/286,143, filed on Sep. 29, 2008; "TOUCH PANEL AND DISPLAY DEVICE USING THE SAME", Ser. No. 12/286,166, filed on Sep. 29, 2008; "TOUCH PANEL AND DISPLAY DEVICE USING THE SAME", Ser. No. 12/286,178, filed on Sep. 29, 2008; "TOUCH PANEL AND DISPLAY DEVICE USING THE SAME" Ser. No. 12/286,348, filed on Sep. 29, 2008; "TOUCHABLE CONTROL DEVICE", Ser. No. 12/286,140, filed on Sep. 29, 2008; "TOUCH PANEL AND DISPLAY DEVICE USING THE SAME", Ser. No. 12/286,146, filed on Sep. 29, 2008; "TOUCH PANEL AND DISPLAY DEVICE USING THE SAME", Ser. No. 12/286,216, filed on Sep. 29, 2008, "TOUCH PANEL AND DISPLAY DEVICE USING THE SAME", Ser. No. 12/286,152, filed on Sep. 29, 2008; "TOUCH PANEL AND DISPLAY DEVICE USING THE SAME", Ser. No. 12/286,145, filed on Sep. 29, 2008; "TOUCH PANEL, METHOD FOR MAKING THE SAME, AND DISPLAY DEVICE ADOPTING THE SAME", Ser. No. 12/286,155, filed on Sep. 29, 2008; "TOUCH PANEL AND DISPLAY DEVICE USING THE SAME". Ser. No. 12/286,179, filed on Sep. 29, 2008; "TOUCH PANEL, METHOD FOR MAKING THE SAME, AND DISPLAY DEVICE ADOPTING THE SAME", Ser. No. 12/286,228, filed on Sep. 29, 2008; "TOUCH PANEL AND DISPLAY DEVICE USING THE SAME", Ser. No. 12/286,153, filed on Sep. 29, 2008; "TOUCH PANEL AND DISPLAY DEVICE USING THE SAME", Ser. No. 12/286,184, filed on Sep. 29, 2008; "METHOD FOR MAKING TOUCH PANEL", Ser. No. 12/286,175, filed on Sep. 29, 2008; "METHOD FOR MAKING TOUCH PANEL", Ser. No. 12/286,195, filed on Sep. 29, 2008; "TOUCH PANEL AND DISPLAY DEVICE USING THE SAME", Ser. No. 12/286,160, filed on Sep. 29, 2008; "TOUCH PANEL AND DISPLAY DEVICE USING THE SAME", Ser. No. 12/286,220, filed on Sep. 29, 2008; "TOUCH PANEL AND DISPLAY DEVICE USING THE SAME", Ser. No. 12/286,227, filed on Sep. 29, 2008; "TOUCH PANEL AND DISPLAY DEVICE USING THE SAME", Ser. No. 12/286,144, filed on Sep. 29, 2008; "TOUCH PANEL AND DISPLAY DEVICE USING THE SAME", Ser. No. 12/286,218, filed on Sep. 29, 2008; "TOUCH PANEL. AND DISPLAY DEVICE USING THE SAME", Ser. No. 12/286,142, filed on Sep. 29, 2008; "TOUCH PANEL AND DISPLAY DEVICE USING THE SAME", Ser. No. 12/286,241, filed on Sep. 29, 2098; "TOUCH PANEL, METHOD FOR MAKING THE SAME, AND DISPLAY DEVICE ADOPTING THE SAME", Ser. No. 12/286,151, filed on Sep. 29, 2008; and "TOUCH PANEL, METHOD FOR MAKING THE SAME, AND DISPLAY DEVICE ADOPTING THE SAME", Ser. No. 12/286, 219, filed on Sep. 29, 2008. The disclosures of the above-identified applications are incorporated herein by reference.

BACKGROUND

1. Field of the Invention

The present invention relates to touch panels and, particularly, to a carbon nanotube based touch panel.

2. Discussion of Related Art

Following the advancement in recent years of various electronic apparatuses such as mobile phones, car navigation systems and the like toward high performance and diversification, there is continuous growth in the number of electronic apparatuses equipped with optically transparent touch panels in front of their display devices such as liquid crystal panels. A user of any such electronic apparatus operates it by pressing a touch panel with a finger, a pen, or the like tool while visually observing the display device through the touch panel. A demand thus exists for such touch panels that are superior in visibility and reliable in operation.

At present, different types of touch panels, including a resistance-type, a capacitance-type, an infrared-type and a surface sound wave-type have been developed. Due to a higher accuracy and a low-cost of the production, the resistance-type touch panels have been widely used.

A conventional resistance-type touch panel includes an upper substrate, an optically transparent upper conductive layer formed on a lower surface of the upper substrate, a lower substrate, an optically transparent lower conductive layer formed on an upper surface of the lower substrate, and a plurality of dot spacers formed between the optically transparent upper conductive layer and the optically transparent lower conductive layer. The optically transparent upper conductive layer and the optically transparent lower conductive layer are formed of conductive indium tin oxide (ITO).

In operation, an upper surface of the upper substrate is pressed with a finger, a pen or the like tool and visual observation of a screen on the liquid crystal display device provided on a back side of the touch panel is allowed. This causes the upper substrate to be deformed, and the upper conductive layer to come in contact with the lower conductive layer at a position being pressed. Voltages are applied successively from an electronic circuit to the optically transparent upper conductive layer and the optically transparent lower conductive layer. Thus, the deformed position can be detected by the electronic circuit.

However, the ITO layer (i.e. the optically transparent conductive layer) is generally formed by means of ion-beam sputtering, and the method is relatively complicated. Furthermore, the ITO layer has poor wearability, low chemical endurance and uneven resistance in an entire area of the panel. Additionally, the ITO layer has a relatively low transparency. All the above-mentioned problems of the ITO layer makes for a touch panel with low sensitivity, accuracy, and brightness.

What is needed, therefore, is to provide a durable touch panel having high sensitivity, accuracy, and brightness.

SUMMARY OF THE INVENTION

In one embodiment, a touch panel includes a first electrode plate, a second electrode plate separated from the first electrode plate. The first electrode plate includes a first substrate and a first conductive layer disposed on a lower surface of the first substrate. The second electrode plate includes a second substrate and a second conductive layer disposed on an upper surface of the second substrate. The first conductive layer and the second conductive layer each include a carbon nanotube film.

Other advantages and novel features of the present touch panel will become more apparent from the following detailed description of preferred embodiments when taken in conjunction with the accompanying drawings.

BRIEF DESCRIPTION OF THE DRAWINGS

Many aspects of the present touch panel can be better understood with reference to the following drawings. The components in the drawings are not necessarily to scale, the emphasis instead being placed upon clearly illustrating the principles of the present touch panel.

Corresponding reference characters indicate corresponding parts throughout the several views. The exemplifications set out herein illustrate at least one embodiment of the present touch panel, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present touch panel.

Figure 1:
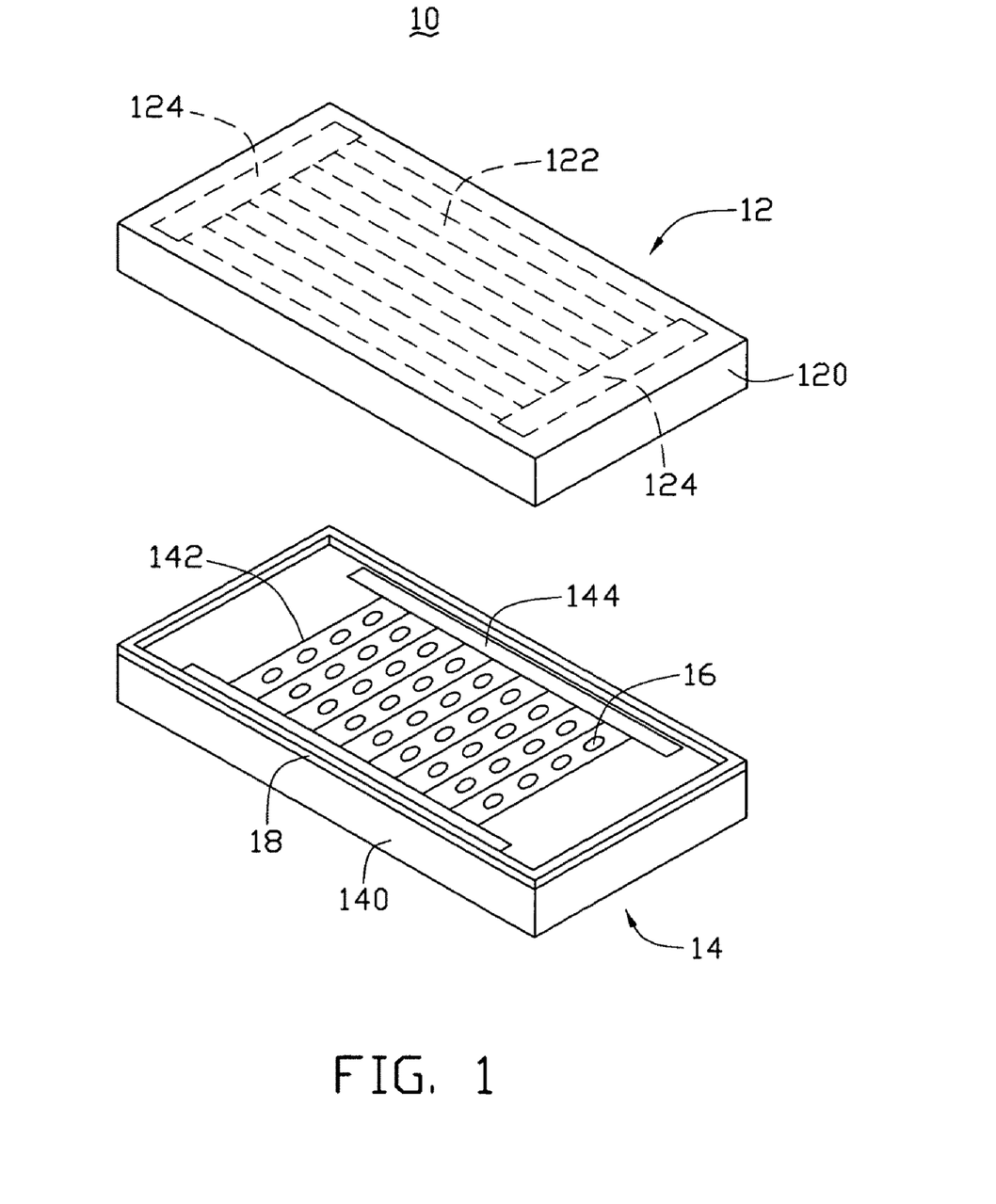
FIG. 1 is a schematic view of a partially assembled touch panel in accordance with a present embodiment.
Figure 2:
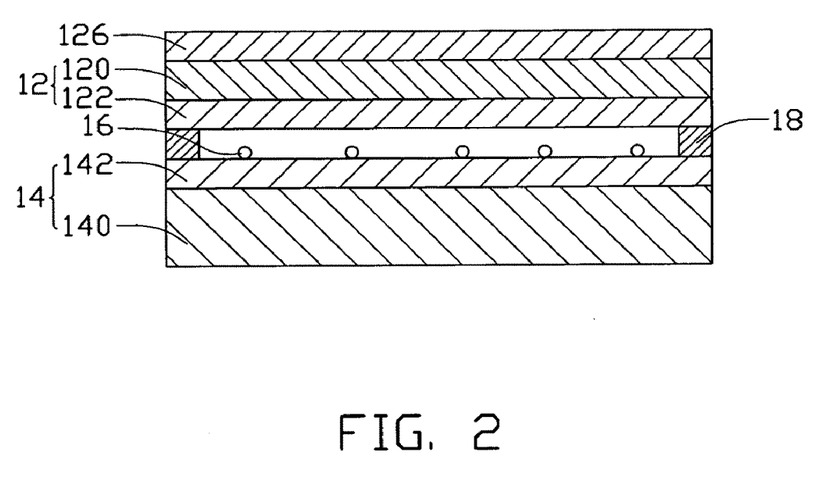
FIG. 2 is a cross-section view of the touch panel of FIG. 1.

Referring to FIG. 1 and FIG. 2, a touch panel 10 includes a first electrode plate 12, a second electrode plate 14, and a plurality of dot spacers 16 disposed between the first electrode plate 12 and the second electrode plate 14.

The first electrode plate 12 includes a first substrate 120, a first conductive layer 122, and two first-electrodes 124. The first substrate 120 includes an upper surface and a lower surface, each of which is substantially flat. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite ends of the second conductive layer 142. A direction from one of the second-electrodes 144 across the second conductive layer 142 to the other second-electrodes 144 is defined as a second direction. The two second-electrodes 144 are electrically connected with the second conductive layer 142.

The first direction is perpendicular to the second direction (i.e. the two first-electrodes are orthogonal to the two second-electrodes). That is, the two first-electrodes 124 are aligned parallel to the second direction, and the two second-electrodes 144 aligned parallel to the first direction. The first substrate 120 is a transparent and flexible film/plate made of polymer, resin, or any other flexible material. The second substrate 140 is a rigid and transparent board made of glass, diamond, quartz, plastic or any other suitable material. The material of the first substrate 120 can be selected from a group consisting of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. In the present embodiment, the first substrate 120 is made of PET, and the thickness thereof is about 2 millimeters; the second substrate 140 is made of glass. It is noted that, the electrodes of the flexible touch panel should be tough but flexible. In the present embodiment, the first-electrodes 124 and the second-electrodes 144 are made of conductive silver paste.

In one embodiment, an insulative layer 18 is provided between the first and the second electrode plates 12 and 14. The first electrode plate 12 is located on the insulative layer 18. The first conductive layer 122 is opposite to, but is spaced from, the second conductive layer 142. The dot spacers 16 are separately located on the second conductive layer 142. A distance between the second electrode plate 14 and the first electrode plate 12 is in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16. It is to be understood that the dot spacers 16 are optional, particularly when the touch panel 10 is relatively small. They serve as supports given the size of the span and the strength of the first electrode plate 12.

In one embodiment, a transparent protective film 126 can be further disposed on the upper surface of the first electrode plate 12. The transparent protective film 126 can be a plastic film and receives a surface hardening treatment to protect the first electrode plate 12 from being scratched when in use.

The first conductive layer 122 and the second conductive layer 142 can include carbon nanotube films. The carbon nanotube films are formed by a plurality of carbon nanotubes, ordered or otherwise, and can have a uniform thickness.

Figure 3:
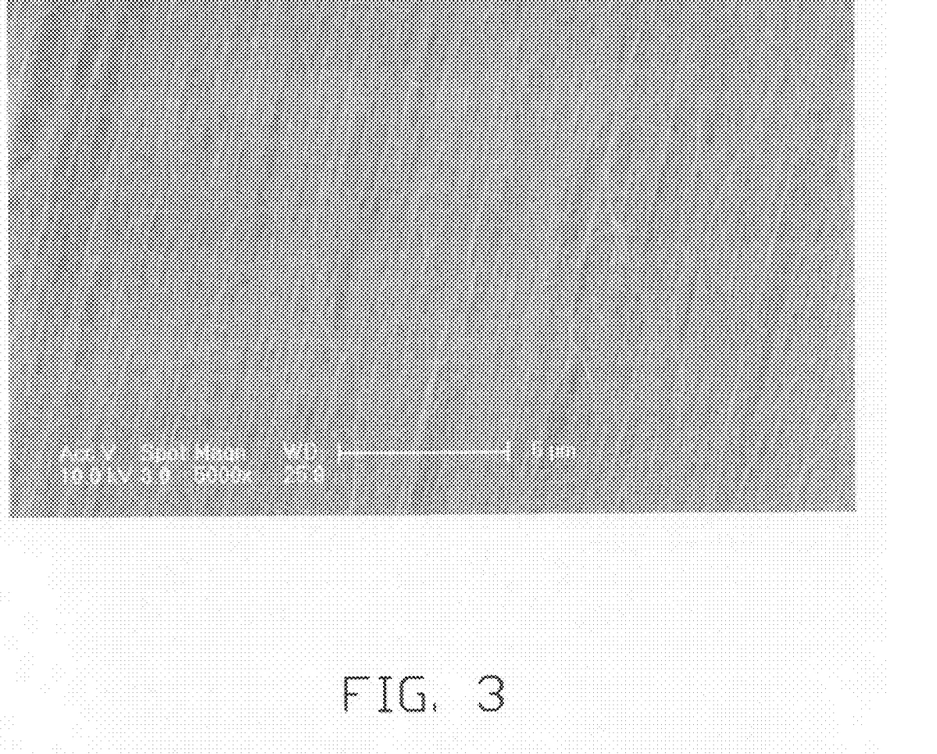
FIG. 3 shows a Scanning Electron Microscope (SEM) image of a carbon nanotube film used in the touch panel of FIG. 1.

In the present embodiment, single layer or multi-layer carbon nanotube film can be used as the first conductive layer 122 and the second conductive layer 142. Alignment direction of the layers in the multi-layer carbon nanotube films is set as desired. The carbon nanotubes in each layer of the carbon nanotube films are aligned in the same direction. More specifically, each layer of the carbon nanotube film includes a plurality of successive and oriented carbon nanotubes joined end to end by the van der Waals attractive force. The majority of nanotubes in each carbon nanotube film are arranged along a primary direction; however, the orientation of some of the nanotubes may vary as shown in FIG. 3. In one suitable embodiment, the carbon nanotubes in the first conductive layer 122 are oriented in the first direction, and the carbon nanotubes in the second conductive layer 142 are oriented in the second direction.

Figure 4:
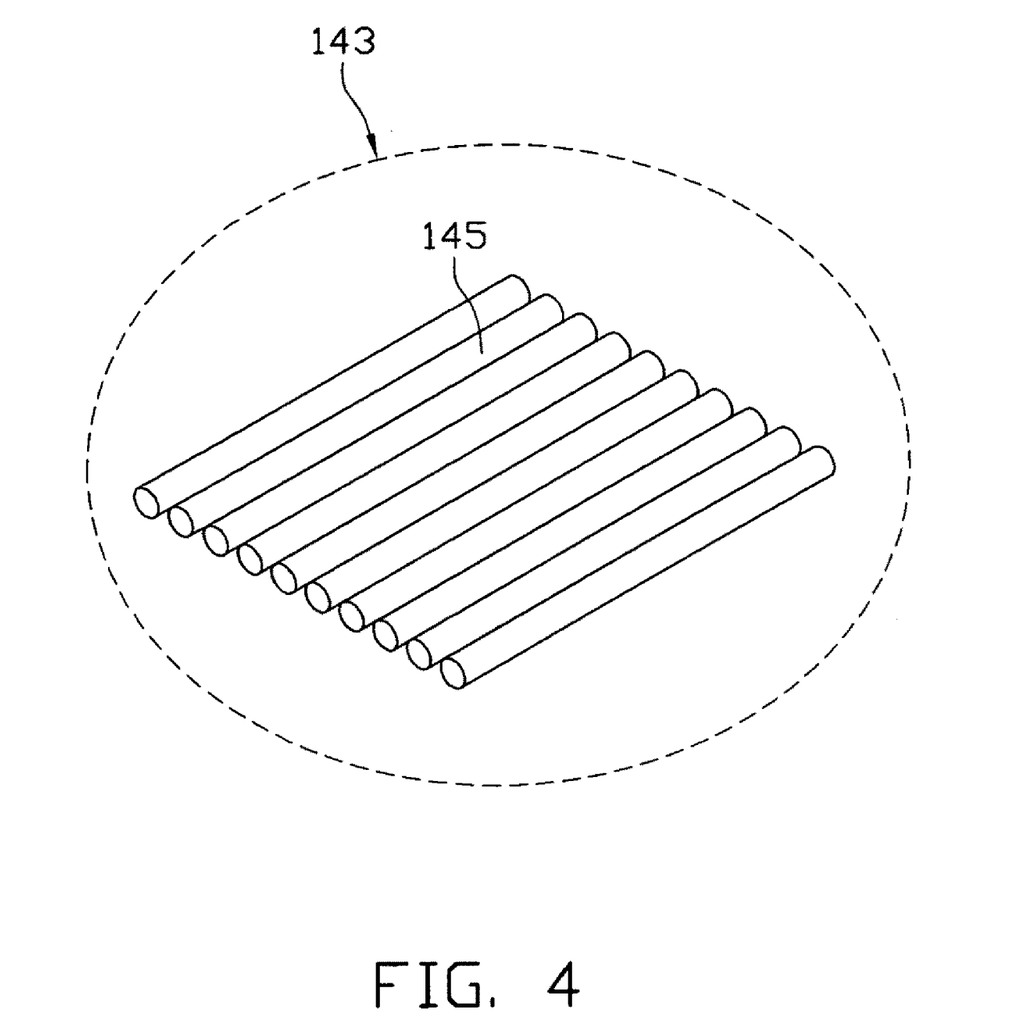
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. A length and a width of the carbon nanotube film can be arbitrarily set as desired. A thickness of the carbon nanotube film approximately ranges from 0.5 nanometers to 100 micrometers. A distance between adjacent carbon nanotube structures can be in an approximate range from 5 nanometers to 1 millimeter. The carbon nanotubes 145 in the carbon nanotube structures 240 can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

A method for fabricating an above-described carbon nanotube film includes the steps of: (a) providing an array of carbon nanotubes, specifically, providing a super-aligned array of carbon nanotubes; (b) pulling out a carbon nanotube film from the array of carbon nanotubes, by using a tool (e.g., adhesive tape or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array can be multi-wall carbon nanotubes, double-wall carbon nanotubes, and/or single-wall carbon nanotubes.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the carbon nanotube film, can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The width of the carbon nanotube film depends on a size of the carbon nanotube array. The length of the carbon nanotube film can be arbitrarily set as desired. In one useful embodiment, when the substrate is a 4-inch type wafer as in the present embodiment, the width of the carbon nanotube film is in the approximate range from 0.5 nanometers to 10 centimeters, and the thickness of the carbon nanotube film is in the approximate range from 0.5 nanometers to 100 microns.

It is noted that because the carbon nanotubes in the super-aligned array have a high purity and a high specific surface area, the carbon nanotube film is adhesive. As such, the first carbon nanotube film can be adhered to a surface of the first substrate 120 or the second substrate 140 directly. In the alternative, other bonding means can be applied.

In one embodiment, an additional step (c) of treating the carbon nanotube films in the touch panel 10 with an organic solvent can be further provided after step (b).

In step (c), a surface of the carbon nanotube films can be treated with an organic solvent. Specifically, the carbon nanotube film can be treated by applying organic solvent to the carbon nanotube film to soak the entire surface of the carbon nanotube film. The organic solvent is volatile and can be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the substrate 120,140 after the organic solvent treatment due to the surface tension of the organic solvent. Then the contacting area of the carbon nanotube film with the substrate will increase, and thus, the carbon nanotube film can more firmly adhere to the surface of the substrate 120,140. In another aspect, due to the decrease of the specific surface area via bundling, the mechanical strength and toughness of the carbon nanotube film are increased and the coefficient of friction of the carbon nanotube films is reduced. Macroscopically, the film will be approximately the same uniform carbon nanotube film.

It is to be understood that, a plurality of carbon nanotube films can be adhered to the first conductive layer 122 or the second conductive layer 142. They can be overlapped with each other to form a multi-layer carbon nanotube film on each conductive layer or can be coplanar. The number of the layers and the angle between the aligned directions of two adjacent layers can be arbitrarily set as desired. The layers of the carbon nanotube film are combined by van de Waals attractive force to form a stable multi-layer film.

Figure 5:
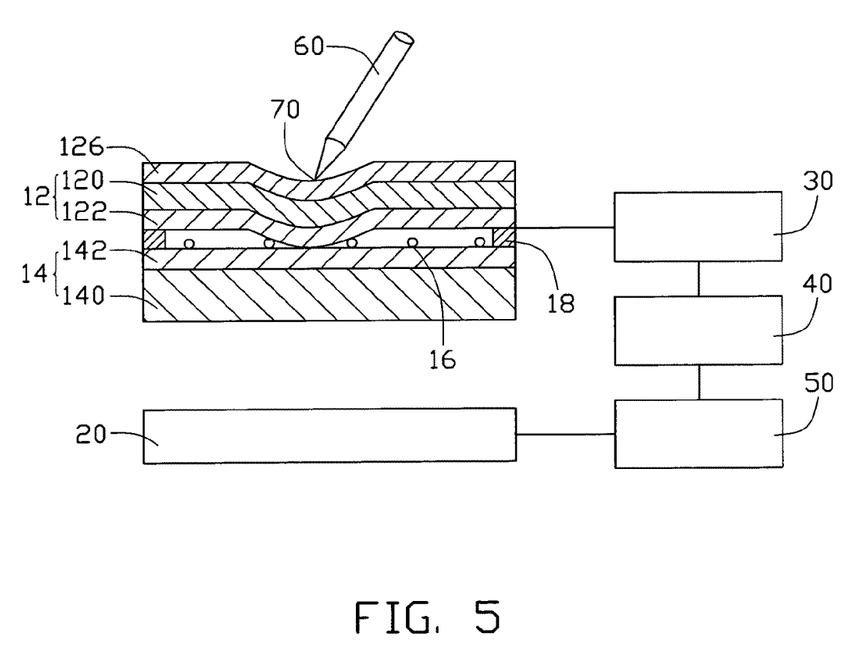
FIG. 5 is a schematic assembled view of the touch panel of FIG. 1 in use.

Referring to FIG. 5, a display includes the touch panel 10, a display element 20, a first controller 30, a central processing unit (CPU) 40, and a second controller 50. The touch panel 10 is disposed on the display element 20 directly and connected to the first controller 30 by an external circuit. The CPU 40 is connected to the second controller 50 to control the display element 20. In operation, a voltage of 5V is applied to the first electrode plate 12 and the second electrode plate 14 respectively. A user operates the display by pressing the first electrode plate 12 of the touch panel 10 with a finger, a pen 60, or the like while visually observing the display element 20 through the touch panel. This pressing causes a deformation 70 of the first electrode plate 12. The deformation 70 of the first electrode plate 12 causes a connection between the first conductive layer 122 and the second conduction layer 142 of the second electrode plate 14. Changes in voltages in the first direction of the first conductive layer 142 and the second direction of the second conductive layer 142 can be detected by the first controller 30 and sent to the CPU 40 to calculate position of the deformation.

The properties of the carbon nanotubes provide superior toughness, high mechanical strength, and uniform conductivity to the carbon nanotube film. Thus, the touch panel adopting the carbon nanotube film is durable and highly conductive. Further, the pulling method for fabricating the carbon nanotube film is simple and the adhesive carbon nanotube film can be disposed on the substrate directly. As such, the method for fabricating the carbon nanotube film is suitable for the mass production of touch panels and reduces the cost thereof. Finally, the carbon nanotube film has a high transparency for improving the brightness of the touch panel.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A touch panel comprising:
a first electrode plate comprising a first substrate and a first conductive layer disposed on a lower surface of the first substrate; and
a second electrode plate spaced from the first electrode plate and comprising a second substrate and a second conductive layer disposed on an upper surface of the second substrate;
wherein each of the first conductive layer and the second conductive layer comprises at least one carbon nanotube film, the at least one carbon nanotube film comprises a plurality of carbon nanotubes substantially aligned along a same direction and parallel to a surface of the carbon nanotube film, and the plurality of carbon nanotubes are joined end to end by van der Waals attractive force.

2. The touch panel as claimed in claim 1, wherein the at least one carbon nanotube film comprises two carbon nanotube films, each of the two carbon nanotube films comprises the plurality of carbon nanotubes, and the plurality of carbon nanotubes in the two carbon nanotube films are oriented in different directions.

3. The touch panel as claimed in claim 1, wherein a thickness of the at least one carbon nanotube film is in an approximate range from 0.5 nanometers to 100 microns.

4. The touch panel as claimed in claim 1, wherein the first electrode plate further comprises two first-electrodes, and each of the two first-electrodes is electrically connected to the first conductive layer, a direction from one of the two first-electrodes across the first conductive layer to the other of the two first-electrodes is defined as a first direction.

5. The touch panel as claimed in claim 4, wherein the plurality of carbon nanotubes of the at least one carbon nanotube film in the first conductive layer are oriented along the first direction.

6. The touch panel as claimed in claim 5, wherein the second electrode plate further comprises two second-electrodes, a direction from one of the two second-electrodes across the second conductive layer to the other of the two second-electrodes being defined as a second direction.

7. The touch panel as claimed in claim 6, wherein the plurality of carbon nanotubes of the at least one carbon nanotube film in the second conductive layer are oriented along the second direction.

8. The touch panel as claimed in claim 1, further comprising an insulative layer between the first electrode plate and the second electrode plate to insulate the first electrode plate from the second electrode plate.

9. The touch panel as claimed in claim 8, wherein a plurality of dot spacers are disposed between the first electrode plate and the second electrode plate.

10. The touch panel as claimed in claim 9, wherein both the insulative layer and the dot spacers are comprised of insulative resin.

11. The touch panel as claimed in claim 1, wherein the first substrate is a polyester film, and the second substrate is a glass plate.

12. The touch panel as claimed in claim 7, wherein the first direction is substantially perpendicular to the second direction.

13. A touch panel comprising:
a first electrode plate comprising a first substrate, a first conductive layer disposed on a lower surface of the first substrate, and two first-electrodes disposed on opposite ends of the first conductive layer, a direction from one of the two first-electrodes across the first conductive layer to the other of the two first-electrodes is defined as a first direction; and
a second electrode plate spaced from the first electrode plate and comprising a second substrate, a second conductive layer disposed on an upper surface of the second substrate, and two second-electrodes disposed on opposite ends of the second conductive layer, a direction from one of the two second-electrodes across the second conductive layer to the other of the two second-electrodes being defined as a second direction;
wherein the first conductive layer comprises a first carbon nanotube film, the first carbon nanotube film comprises a plurality of first carbon nanotubes, the second conductive layer comprises a second carbon nanotube film, the second carbon nanotube film comprises a plurality of second carbon nanotubes, the plurality of first carbon nanotubes in the first conductive layer are arranged along the first direction, and the plurality of second carbon nanotubes in the second conductive layer are arranged along the second direction.

14. The touch panel as claimed in claim 13, wherein the first direction is substantially perpendicular to the second direction.

15. A touch panel comprising:
a first electrode plate comprising a first substrate and a first conductive layer disposed on a lower surface of the first substrate; and
a second electrode plate spaced from the first electrode plate and comprising a second substrate and a second conductive layer disposed on an upper surface of the second substrate;
wherein each of the first conductive layer and the second conductive layer consists of a carbon nanotube film, and the carbon nanotube film consists of a plurality of unfunctionalized carbon nanotubes.

16. The touch panel as claimed in claim 15, wherein the carbon nanotube film is drawn from a carbon nanotube array.

17. The touch panel as claimed in claim 16, wherein the plurality of unfunctionalized carbon nanotubes are substantially aligned along a same direction and parallel to a surface of the carbon nanotube film, and the plurality of carbon nanotubes are joined end to end by van der Waals attractive force.

18. The touch panel as claimed in claim 17, wherein the first electrode plate further comprises two first-electrodes, and each of the two first-electrodes is electrically connected to the first conductive layer, a direction from one of the two first-electrodes across the first conductive layer to the other of the two first-electrodes is defined as a first direction, and the plurality of unfunctionalized carbon nanotubes of the carbon nanotube film in the first conductive layer are oriented along the first direction.

19. The touch panel as claimed in claim 18, wherein the second electrode plate further comprises two second-electrodes, and each of the two second-electrodes is electrically connected to the second conductive layer, a direction from one of the two second-electrodes across the second conductive layer to the other of the two second-electrodes is defined as a second direction, and the plurality of unfunctionalized carbon nanotubes of the carbon nanotube film in the second conductive layer are oriented along the second direction.

* * * * *